United States Patent [19]

Ide et al.

[11] Patent Number: 5,772,374
[45] Date of Patent: Jun. 30, 1998

[54] TAPPING SCREW AND MECHANISM OF ENGAGING MEMBER TO BE ENGAGED USING THE SAME

[75] Inventors: Masaaki Ide; Hiroyuki Matsubara, both of Aichi-ken, Japan

[73] Assignee: Aoyama Seisakusho Co., Ltd., Aichi-ken, Japan

[21] Appl. No.: 768,999

[22] Filed: Dec. 18, 1996

[30] Foreign Application Priority Data

Jan. 8, 1996 [JP] Japan ..................................... 8-000976

[51] Int. Cl.⁶ .............................. F16B 25/00; F16B 35/04
[52] U.S. Cl. ............................ 411/386; 411/416; 411/418
[58] Field of Search ..................................... 411/386, 387, 411/416, 417, 418, 420, 421

[56] References Cited

U.S. PATENT DOCUMENTS 3,812,639   5/1974   Sygnator ................................. 411/387
4,486,135  12/1984   Kazino .

FOREIGN PATENT DOCUMENTS 292734  11/1988   European Pat. Off. ............... 411/386

Primary Examiner—Neill R. Wilson
Attorney, Agent, or Firm—Frishauf, Holtz, Goodman, Langer & Chick

[57] ABSTRACT

A tapping screw engages a member to be engaged with a base plate made of metal by tapping a burring hole formed on the base plate. The tapping screw includes a main body having a shank and a head formed at a base end of the shank. A reduced diameter shank portion extends from a fore end portion of the shank of the main body, and has a taper angle $\theta$ of 9° to 14° and a substantially rounded triangle shaped cross-section. Recesses having no thread are formed at three faces of the reduced diameter shank portion so that a circumferential width of each recess is gradually reduced toward a tip end of the reduced diameter shank portion. Each recess is formed by a steep face facing a screwing direction of the tapping screw and a gentle face oppositely facing the steep face to form a groove.

2 Claims, 4 Drawing Sheets

TAPPING SCREW AND MECHANISM OF ENGAGING MEMBER TO BE ENGAGED USING THE SAME

BACKGROUND OF THE INVENTION

This invention relates to a tapping screw and a mechanism of engaging a member to be engaged using the same.

As a method of engaging a member to be engaged with a base plate made of a metal such as a steel plate without using a nut, a method in which a tapping screw shown in FIG. 5 and FIG. 6 (wherein 3', 3b' and 5' are constitutional elements of the tapping screw and are a main shank portion, a reduced diameter shank portion and a recess) is screwed into a hole piercing said base plate has been disclosed in U.S. Pat. No. 4,486,135. However, by the above method, a member to be engaged can be engaged with only a thin base plate having a thickness of 0.6 mm or less.

Under the existing circumstances, in the case of a base plate which is thickened (e.g. 2.0 mm or more) in order to obtain higher fastening strength and in the case of a base plate (30 in FIG. 7, and wherein 32 in FIG. 7 is a member to be engaged) in which said hole is a burring hole (33 in FIG. 7), internal threads are previously cut at the circumferential surface of said hole before engagement. This method however, has a problem in that an additional step is required for thread cutting which impairs operational efficiency.

SUMMARY OF THE INVENTION

In order to solve the above problems, the present inventors have intensively studied tapping screws in connection with a thick base plate or a base plate in which said hole is a burring hole and consequently found that the tapping screw used in a known method has a taper angle θ of a reduced diameter shank portion of said tapping screw which is as large as 20°, so that much screwing torque is required (see FIG. 4). It should be noted that the specifications of a base plate and a tapping screw provided for measurement are Base Plate (a) Material: SPCC, (b) Thickness: 0.6 mm, (c) Burring hole diameter: 4.4 mm; and Tapping Screw: (a) Shank diameter: M6, (b) Tip end diameter of a reduced diameter shank portion: 3.0 mm. It can be seen that although the base plate was considerably thin, i.e., 0.6 mm, much screwing torque was required. Further, the inventors found that in the case where said hole is a burring hole, in an initial stage of screwing into said hole, the threads of the tapping screw touch the arcuate circumferential portion of said hole (the R-shaped portion of said hole in FIG. 7), so that it is difficult for the threads to dig into the circumferential portion of said hole.

An object of the present invention is to provide a tapping screw in which digging is easy and screwing can be carried out with less screwing torque.

That is, the present invention relates to a tapping screw for engaging a member to be engaged while tapping of a hole formed on a base plate having a thickness of 2.0 mm or more or a burring hole formed on a base plate is carried out, which comprises a main body having a shank and a head formed at the base end of the shank; a reduced diameter shank portion having a taper angle θ of 9° to 14° and a substantially rounded triangle shaped cross-section, extending from the fore end portion of said shank of the main body; and recesses having no thread, formed at three faces of said reduced diameter shank portion so that a circumferential width of each recess is gradually reduced toward the tip end of the reduced diameter shank portion and each recess is formed by a steep face facing the screwing direction of said screw and a gentle face oppositely facing the steep face, whereby the section of each recess is a bluff groove. The engaging mechanism of the present invention comprises sandwiching a member to be engaged between the lower face of the head of the tapping screw having the above features and the above base plate, to be engaged with the base plate. Here, the reason for setting the taper angle θ at 9° to 14° is that if the taper angle is less than 9°, there is no difference in screwing torque, the main body becomes too long to increase an amount of a material to be used, and much time is required for screwing operation due to the long main body; and on the other hand, if it exceeds 14°, screwing torque cannot be made less.

DESCRIPTION OF THE PREFERRED EMBODIMENTS

Figure 1:
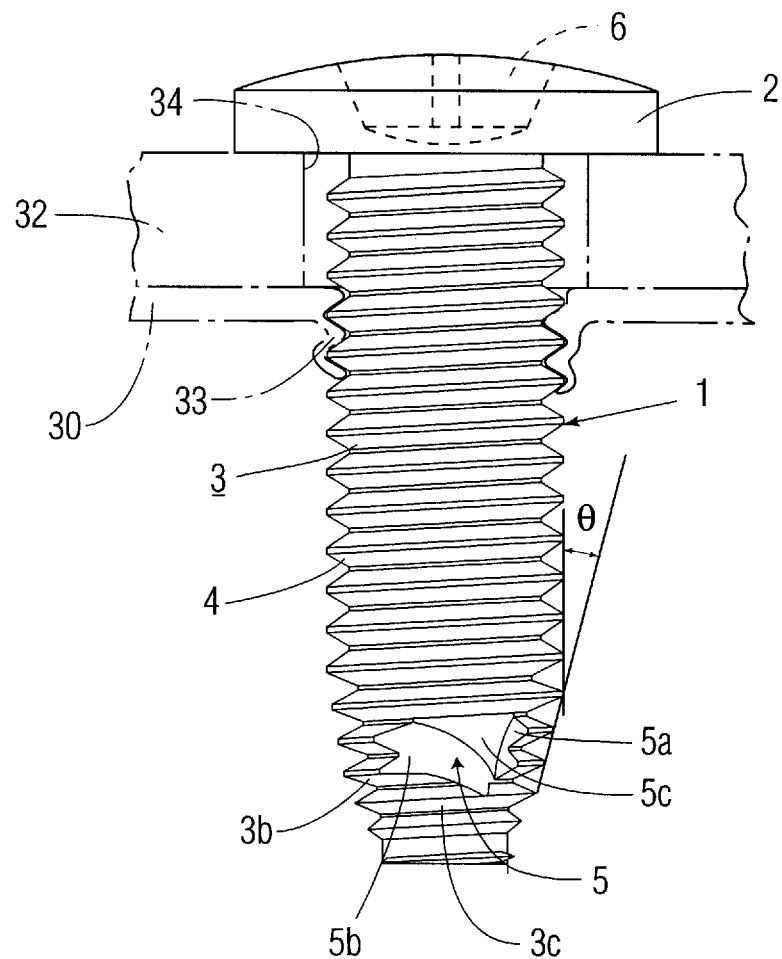
FIG. 1 is a front view showing a state at the time of completing engagement of a preferred embodiment of the tapping screw of the present invention.
Figure 2:
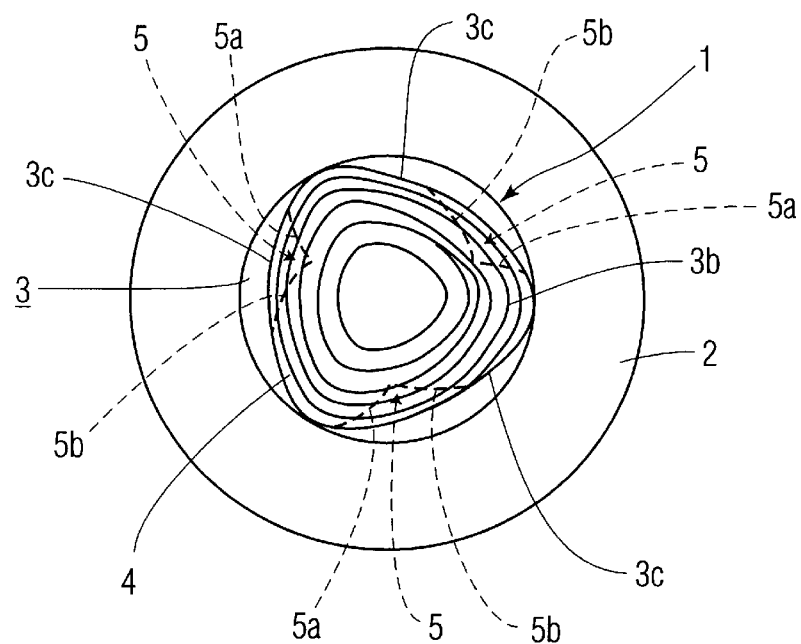
FIG. 2 is a bottom view of a preferred embodiment of the tapping screw of the present invention.

In the following, the embodiments of the present invention are explained in detail by referring to the drawings. The embodiments are explained by taking the case of a burring hole.

Figure 3:
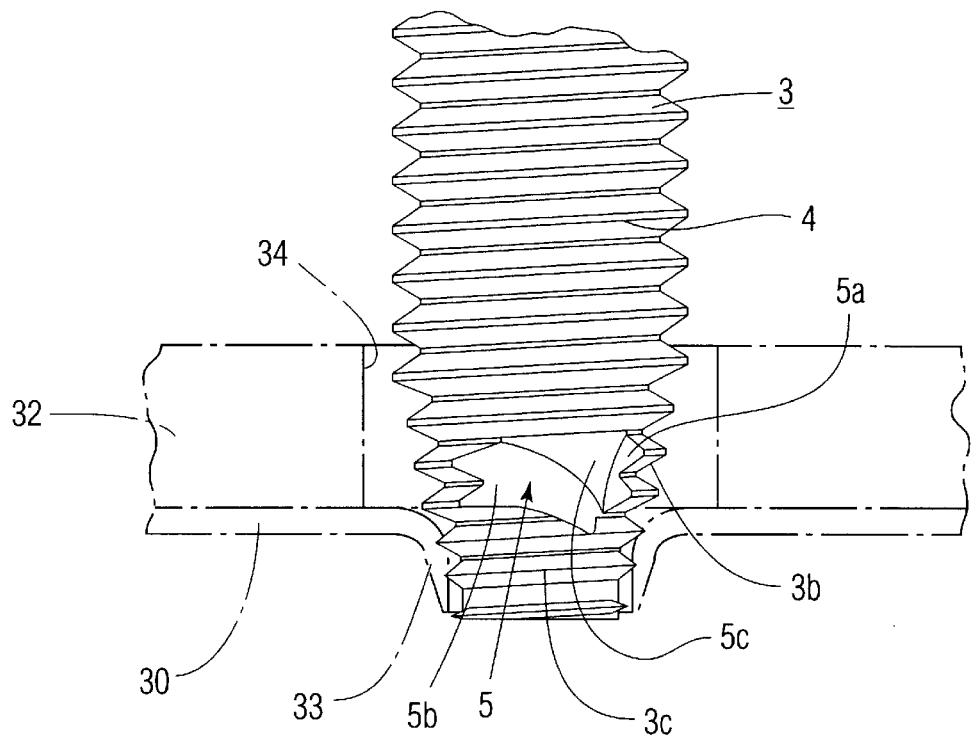
FIG. 3 is a front view showing a state that a reduced diameter shank portion of a preferred embodiment of the tapping screw of the present invention touches an internal circumferential surface of a burring hole.
Figure 4:
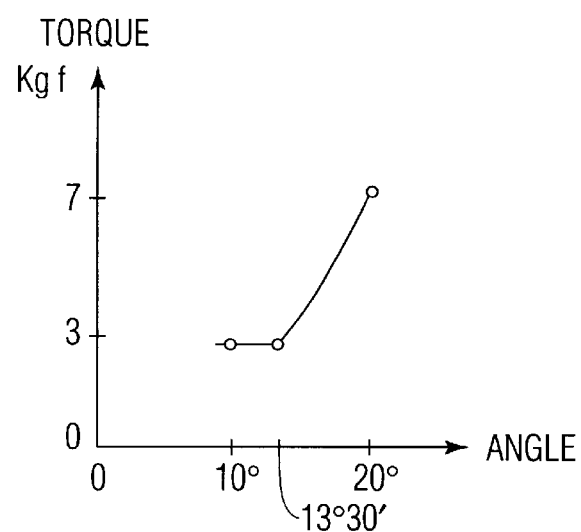
FIG. 4 is a graph showing a relation between the taper angle of a reduced diameter shank portion and screwing torque.
Figure 5:
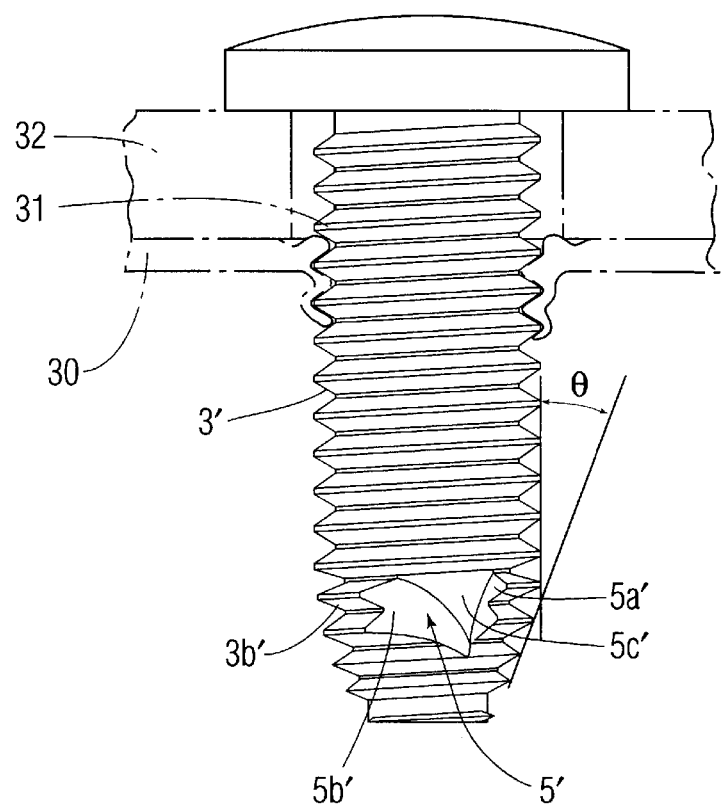
FIG. 5 is a front view showing a state at the time of completing engagement of a conventional tapping screw.
Figure 6:
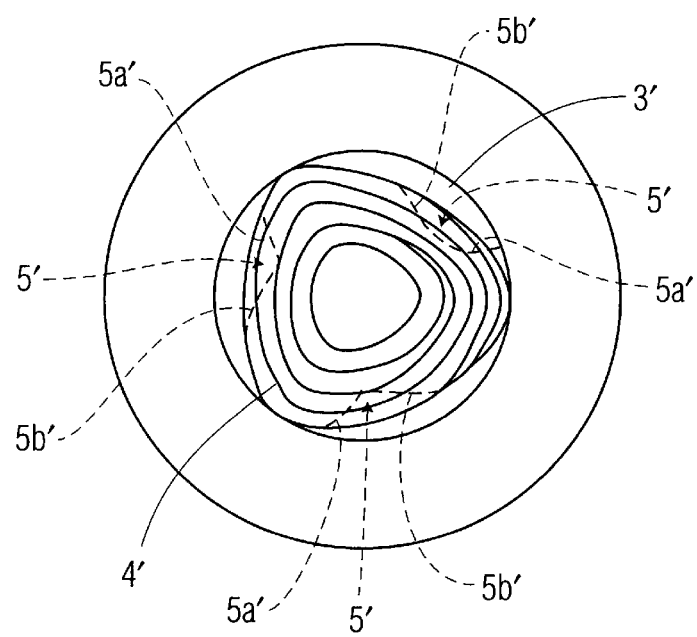
FIG. 6 is a bottom view of a conventional tapping screw.
Figure 7:
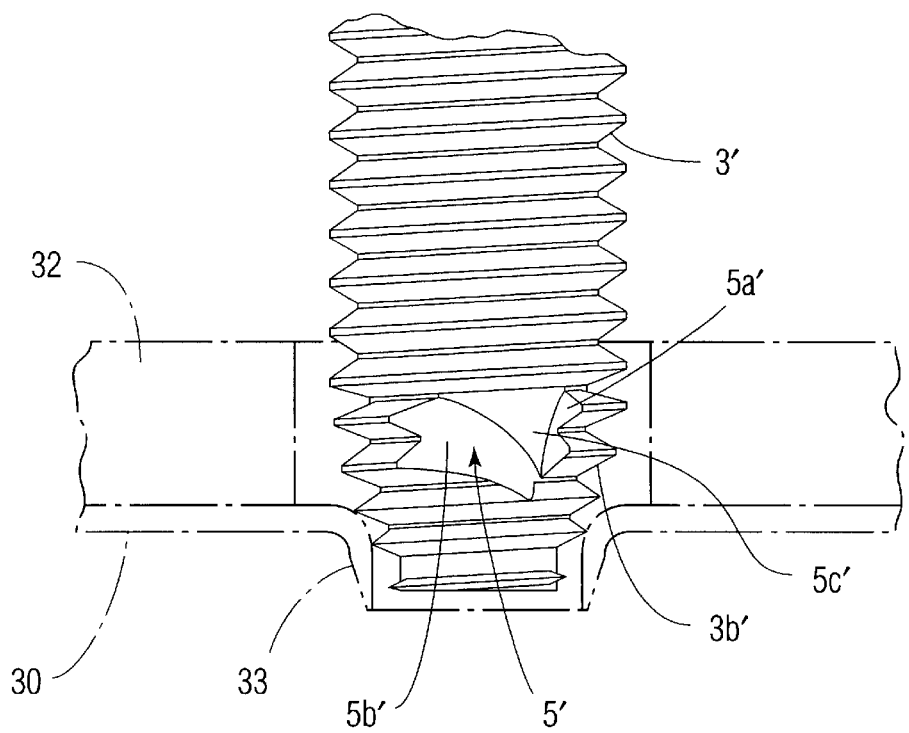
FIG. 7 is a front view showing a state that a reduced diameter shank portion of a conventional tapping screw touches an internal circumferential surface of a burring hole.

1 is a main body having a shank 3 provided perpendicularly at the lower face of a head 2. From the fore end portion of the shank 3 of said main body 1, there is extended reduced diameter shank portion 3b which has a taper angle θ of 13° 30' and which is reduced in its diameter toward the tip end of the reduced diameter shank portion 3b. External threads 4 with the same pitch are continuously formed to the reduced diameter shank portion 3 of the shank 3. 5 is a recess formed on three faces 3c of the reduced diameter shank portion 3b having a substantially rounded triangle shaped cross-section; a circumferential width of said recess 5 is gradually reduced toward the tip end portion of the reduced diameter shank portion 3b; a face 5a facing the screwing direction is formed to be steeper than a face 5b oppositely facing the face 5a; one of a thread section is a bluff groove; and a groove 5c is formed so that screw apexes are deviated with respect to the screwing direction. 6 is a mathematical symbol "minus" or "plus"-shaped engagement slit with which a tool such as a driver is engaged, formed on the upper face of the head 2. In the tapping screw constituted as described above, the reduced diameter shank portion 3b having a taper angle of 13° 30' corresponding to the shape of a burring hole is extended from the fore end portion of the shank 3 of the main body 1, so that by inserting the shank 3 of the main body 1 into a burring hole 33 of a base plate 30 through an inserting hole 34 of a member 32 to be engaged, two threads of the threads existing at the tip end side of the reduced diameter shank portion 3b having a substantially rounded triangle shaped cross-section touch the internal circumferential surface of the burring hole 33 as shown in FIG. 3. Therefore, by turning the main body 1, the threads touching the internal circumferential surface of the burring hole 33 cut two internal threads at the internal circumferential surface of said hole 33, the reduced diameter shank portion 3b is inserted spirally along the cut internal threads, and accompanied with spiral insertion of the reduced diameter shank portion 3b, the internal threads are cut deeply. Thus, torque required at the time of initial screwing is less, and even during screwing, subsequent torque is less since the taper angle is small.

At this time, the internal threads are formed by the thread section 5a which is smaller than a thread diameter and is formed at each of the three faces 3c of the reduced diameter shank portion 3b having a substantially rounded triangle shaped cross-section, and the thread section 5a is formed by the recess 5, so that an area contacting with the internal circumferential surface of the burring hole 33 is small. Further, the internal threads are formed while thread grooves formed by thread cutting by the threads existing at the tip end of the reduced diameter shank portion 3b are traced by subsequent threads, so that screwing torque is not increased abruptly, and tapping is carried out securely and unforcedly with less torque. The reduced diameter shank portion 3b is screwed into the burring hole 33 while forming internal threads on the burring hole 33, so that internal threads having a specified size is formed on the burring hole 33. When the shank 3 of the main body 1 is screwed into the burring hole 33 and the lower face of the head 2 touches the upper surface of the member 32 to be engaged, engagement is completed, which means that engagement of the member 32 to be engaged with the base plate 30 is completed.

As clearly seen from the above explanation, the present invention has advantages in that the taper angle of a reduced diameter shank portion of a main body is changed to be as small as 9° to 14° from a conventional taper angle of about 20°, so that even a hole of a thick base plate and a burring hole can be dug by plural threads of the reduced diameter shank portion accurately and so that the required torque in an initial screwing stage is reduced. Even in the case of a burring hole in which an area contacting with threads is increased, much force is not required in the course of screwing since the reduced diameter shank portion has a substantially rounded triangle shaped cross-section and thread sections forming threads are formed by groove-shaped recesses formed at the three faces of the reduced diameter shank portion, whereby the burden of operators can be lightened.

Thus, the present invention provides a tapping screw which overcomes the problems in the art, and a mechanism of engaging a member to be engaged using the same, and therefore greatly contributes to the development of the art.

We claim:

1. A tapping screw for engaging a member to be engaged with a base plate made of metal by tapping a burring hole formed on said base plate, said tapping screw comprising:

a main body having a shank and a head formed at a base end of the shank;

a reduced diameter shank portion having a taper angle $\theta$ of 9° to 14° and a substantially rounded triangle shaped cross-section, said reduced diameter shank portion extending from a fore end portion of said shank of the main body; and recesses having no thread, said recesses being formed at three faces of said reduced diameter shank portion so that a circumferential width of each recess is gradually reduced toward a tip end of the reduced diameter shank portion, and each recess being formed by a steep face facing a screwing direction of said tapping screw and a gentle face oppositely facing the steep face to form a groove.

2. A method of engaging a member to be engaged between a tapping screw and a base plate made of metal having a burring hole for receiving said tapping screw, said method comprising:

sandwiching the member to be engaged between an upper surface of said base plate and a lower face of a head of said tapping screw, wherein said tapping screw comprises:

a main body having a shank and a head formed at a base end of the shank;

a reduced diameter shank portion having a taper angle $\theta$ of 9° to 14° and a substantially rounded triangle shaped cross-section, said reduced diameter shank portion extending from a fore end portion of said shank of the main body; and recesses having no thread, said recesses being formed at three faces of said reduced diameter shank portion so that a circumferential width of each recess is gradually reduced toward a tip end of the reduced diameter shank portion, and each recess being formed by a steep face facing a screwing direction of said tapping screw and a gentle face oppositely facing the steep face to form a groove; and tapping said burring hole of said base plate with said tapping screw to sandwich said member to be engaged between the upper surface of said base plate and the lower face of the head of said tapping screw to be engaged with said base plate.

* * * * *